United States Patent [19]

Maertens et al.

[11] 3,855,361
[45] Dec. 17, 1974

[54] TRANS-1,5-POLYPENTENAMER WITH IMPROVED PROCESSING PROPERTIES

[75] Inventors: Dieter Maertens, Leverkusen; Josef Witte, Cologne; Manfred Beck, Odenthal-Gloebusch, all of Germany

[73] Assignee: Bayer Aktiengesellschaft, Leverkusen, Germany

[22] Filed: Apr. 25, 1973

[21] Appl. No.: 354,180

Related U.S. Application Data

[63] Continuation of Ser. No. 198,430, Nov. 12, 1971, abandoned.

[30] Foreign Application Priority Data

Nov. 14, 1970 Germany.............................. 2056178

[52] U.S. Cl. ............................ 260/93.1, 260/23 AR
[51] Int. Cl............................. C08f 1/28, C08f 7/02

[58] Field of Search.................................... 260/93.1

[56] References Cited
UNITED STATES PATENTS

| 3,631,010 | 12/1971 | Witte et al........................ 260/32.1 |
| 3,753,928 | 8/1973 | Schon et al. ..................... 252/429 B |

*Primary Examiner*—Stanford M. Levin
*Attorney, Agent, or Firm*—Connolly and Hutz

[57] ABSTRACT

A process for the preparation of trans-polyalkenamers by the polymerisation of cycloolefines in solutions of hydrocarbons with the aid of organometallic mixed catalysts of tungsten compounds, organo aluminium compounds and optionally co-catalysts, wherein polymerisation is carried out in the presence of hydrogen chloride, the molar ratio of hydrogen chloride to tungsten being from 0.1:1 and 10:1.

3 Claims, No Drawings

TRANS-1,5-POLYPENTENAMER WITH IMPROVED PROCESSING PROPERTIES

CROSS-REFERENCE TO RELATED APPLICATION

This application is a continuation of application Ser. No. 198,430, filed Nov. 12, 1971 and now abandoned.

Cyclolefines such as cyclobutene, cyclopentene or cyclooctene can be polymerised with ring opening to yield linear unsaturated polymers by means of mixed organometallic catalysts of compounds of the metals of groups IVB, VB and VIB of the Periodic Table of elements (cf. *Handbook of Chemistry and Physics*, 47$^{th}$ ed. (1966) page B-3) (Ti, Zr, Hf, V, Nb, Ta, Cr, Mo, W) and organometallic compounds of metals of Groups I$a$, II$a$ and III$a$ of the Periodic Table (cf. *Handbook of Chemistry and Physics*, 47$^{th}$ ed. (1966) page B-3) (Li, K, Na, Rb, Be, Mg, Ca, Sr, Ba, Al, Ga, In). The double bonds of the polymers may be predominantly cis-double bonds or trans-double bonds according to the catalyst used. The resulting polymers may be cross-linked to give highly elastic shaped products using known vulcanisation systems, e.g., peroxidic systems or systems which contain sulphur.

When cyclopentene is polymerised with catalysts based on tungsten salts and organo aluminium compounds, the 1,5-polypentenamers obtained have predominantly transdouble bonds (i.e., more than 70 percent). The molecular weights of the polymers produced in this way are usually very high and the molecular weight distribution is narrow.

The molecular weight and the distribution of molecular weight significantly influence the processing properties of a synthetic rubber. Vulcanisable polymers which have a high molecular weight and narrow molecular weight distribution are usually not easily processed with the normal processing apparatus (rollers, internal mixers). In order to describe and compare processing behaviour of a rubber the flow of the product at various shearing stresses or the combination of intrinsic viscosity ($\eta$), Mooney viscosity, defo hardness and defo elasticity (DIN 53 514) is suitable. The combination of these characteristics corresponding to optimum processibility of the uncured rubber is different and specific for each type of elastomer.

It is an object of this invention to produce polyalkenamers with optimum processing properties by providing a wide molecular weight distribution.

This invention relates to a process for preparing polyalkenamers having predominantly trans-configuration which comprises contacting a solution of a cycloolefin in an inert organic solvent with an organometal mixed catalyst of
a. a tungsten compound
b. optionally a cocatalyst
c. an organoaluminium compound in the presence of hydrogen chloride in an amount corresponding to a molar ratio of hydrogen chloride to tungsten of 0.1:1.0 to 10:1.0.

The preferred molar ratio of hydrogen chloride to tungsten is 1:1 to 4:1.

Cycloolefines for the purpose of this invention are in particular cyclomonoolefines having four, five or seven to 18 carbon atoms, e.g., cyclopentene, cycloheptene or cyclododecene. Cyclopentene is preferred.

Organometallic mixed catalysts of the following composition are particularly advantageous for ring opening polymerisation of cycloolefines, particularly cyclopentene according to the present invention:
a. a tungsten salt, preferably tungsten halide or oxyhalide, e.g., $WCl_6$, $WCl_5$, $WBr_5$, $WCl_4O$, $WF_6$;
b. a cocatalyst, e.g.,
1. an epoxide of the general formula

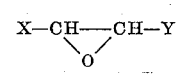

wherein
X = H, alkyl, aryl or aralkyl, and
Y = H, alkyl, aryl, aralkyl or $CH_2$—Hal (Hal = F, cl, Br or I), and
X and Y may be substituted, e.g. by alkyl ($CH_3$—) and/or halogen (Cl),
2. an acetal of the formula:

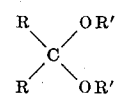

in which
R denotes a hydrogen atom, or an optionally halogenated (F, Cl, Br or I) alkyl, aryl or alkylaryl radical, and
R' denotes an alkylaryl radical which may be substituted with halogen (F, Cl, Br, I),
3. a haloalcohol of the following general formula:

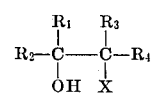

in which
X = F, Cl, Br or I, and
$R_1$ and $R_2$ may be the same or different and represent hydrogen or alkyl, aryl of aralkyl radicals,
$R_3$ and $R_4$ may be the same or different and represent fluorine, chlorine, bromine, iodine, hydrogen, alkyl, aryl or aralkyl, and
$R_1$ and $R_3$ together with the carbon atoms to which they are attached may form a 5-membered or larger carbon ring, or
4. a halophenol of the following general formula:

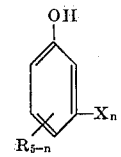

wherein
X = fluorine, chlorine, bromine or iodine, and
R = hydrogen, alkyl, aryl, alkylaryl or a condensed cycloaliphatic or aromatic ring, and
n denotes 1, 2, 3, 4 or 5.
Examples of these co-catalysts are: ethylene oxide, propylene oxide, epichlorohydrin, 2-chloroethanol, 2-bromoethanol, 2-fluoroethanol, 2-iodoethanol, 2-chlorocyclohexanol, 2-chlorocyclopentanol, o-, m- and p-chlorophenol, di-2-chloroethyl formal or diethyl formal; and c. an organo aluminium compound, preferably one of the following formula:

in which

R₁, R₂ and R₃ may represent alkyl, and

R₂ and R₃ may also represent halogen (Cl, Br, F or I) or alkoxy radicals, e.g., Al(iso—C₄H₉)₃, Al(C₂H₅)₃, Al(C₂H₅)₂Cl, AlC₂H₅Cl₂, Al(C₂H₅)₂Br, Al(i—C₄H₉)₂Cl, Al(C₂H₅)₂OC₂H₅ and aluminium sesquihalide, e.g., Al₂(C₂H₅)₃Cl₃.

In the formulae under (a) to (c) above, alkyl radicals are preferably those containing one to six carbon atoms; alkoxy radicals those containing one to six carbon atoms; ary radicals: phenyl, tolyl, naphthyl; aralkyl radicals benzyl; halogen: Cl, Br.

The catalyst components are preferably used in a molar ratio of a:b:c of 1:(0,3 to 10):(0,5 to 15).

According to a preferred embodiment of the process, the tungsten salt (a) is first reacted with co-catalyst (b) in a 0.05 to 0.5 molar solution in hydrocarbon solvents, preferably the same solvent in which polymerisation is carried out, and the dissolved reaction product is used as catalyst component. Much more highly concentrated solutions of the tungsten compounds can be prepared in this way and only two catalyst components need be added. If hydrogen chloride is formed at this stage, as for example when WCl₆ is reacted with chloroethanol, it may be left in the solution of tungsten compound. If desired, the molar ratio of hydrogen chloride to tungsten may be increased by the addition of anhydrous hydrogen chloride. If a lower molar ratio of hydrogen chloride to tungsten is required, a quantity of hydrogen chloride may be removed from the solution of tungsten compound by introducing anhydrous nitrogen, the quantity of hydrogen chloride removed being determined by quantiative analysis. If no hydrogen chloride is formed in the reaction of tungsten salt (a) with co-catalyst (b), as in the case of the reaction of WCl₆ with epichlorohydrin, then the required quantity of hydrogen chloride is added to the solution of tungsten component. Hydrogen chloride may be added separately in the form of a solution in the solvent used or it may be introduced directly in the form of gaseous hydrogen chloride. The quantity of hydrogen chloride required according to the invention is preferably present in the solution of the tungsten component of the organometallic mixed catalyst.

The solvents used may be aliphatic, cycloaliphatic or preferably aromatic hydrocarbons, e.g., hexane, cyclohexane, benzene and toluene, or mixtures thereof.

The process is generally carried out as follows:

Tungsten compound (a) and co-catalyst (b), or preferably the reaction product of (a) and (b), and hydrogen chloride, are added to 5 to 50 percent by weight solutions of the monomer in one of the aforesaid solvents, the solution of reaction product preferably already containing the hydrogen chloride. When the reaction mixture has been adjusted to the required temperature, the organo aluminium compound is added. Polymerisation is carried out at temperatures of −60°C to +60°C, preferably −15°C to +15°C. The polymerisation time is 0.5 to 4 hours. When polymerisation is complete, the organometallic mixed catalyst is inactivated e.g., by the addition of alcohols such as methanol, ethanol or isopropanol, organic acids such as stearic acid or amines such as N-methyl ethanolamine, ethylene diamine or N,N-dimethyl-ethylene diamine. The polymers may be stabilised against oxygen attack by the addition of known antioxidants such as 2,6-ditert-butyl-4-methyl phenol, 2,2'-dihydroxy-3,3'-di-tert-butyl-5,5'-dimethyl-diphenylmethane or phenyl-β-naphthylamine. The process may be carried out either batchwise or continuously.

The polymers may be precipitated from their solutions in the aforesaid solvents by the addition of non-solvents. The preferred technical procedure for isolating the polymers consists of introducing the stopped and stabilised polymer solution into hot water so that an azeotropic mixture of solvenet and water distils off (stripping). The polymer is obtained in the form of crumbs. The crumbs of rubber which are still moist with water are dried e.g., in a drying chamber, on a band drier or in a screw extruder.

The polymers produced according to the invention have a significantly wider distribution of molecular weights than polymers obtained under otherwise identical conditions but in the absence of hydrogen chloride. This results inter alia in a smaller cold flow of the polymer. Small cold flow is essential for storing and stacking the polymer.

The wider molecular weight distribution of the polymers produced according to the invention also manifests itself clearly in the increased values of defo hardness and defo elasticity (according to Baader, DIN 53 514) with practically unchanged values for the Mooney viscosity (ML-4'/100°C, DIN 53 523) and intrinsic viscosity (η). This is important for satisfactory processing of trans-polyalkenamers, especially of trans-1,5-polypentenamer. The material according to the invention forms sheets on the rubber mill very easily. Owing to the higher shearing gradient, fillers and auxiliary materials are quickly and uniformly distributed in the processing on the rubber mill or in Banbury mixers (internal mixers). The properties of the vulcanisate, such as tear resistance and tension values (moduli), are also improved. As stated before the polymers of this invention have predominantly trans-configuration. This is understood to mean that at least 70 percent and preferably 80 – 98 percent of their double bonds is in the trans-configuration.

The polymers according to the invention constitute synthetic rubbers. The properties of vulcanisates obtained therefrom are excellent even when made from highly filled and oil-extended mixtures.

EXAMPLE 1 a. Preparation of the tungsten component 11.9 g of tungsten hexachloride and 200 ml of anhydrous toluene are introduced into a vessel equipped with a stirrer. 4.35 g of 2-chloroethanol dissolved in 93 ml of anhydrous toluene are added dropwise in the course of 60 minutes with vigorous stirring and the exclusion of oxygen and atmospheric moisture. The colour of the solution changes from dark blue to black-brown. Stirring is continued for another hour at room temperature. The solution obtained contains 0.1 mols of tungsten per liter and 1.77 mols of hydrogen chloride per mol of tungsten (see comparison experiment e).

b. Polymerisation of cyclopentene 8500 g of anhydrous toluene and 1,500 g of cyclopentene are introduced into a dry vessel equipped with a stirrer under pure nitrogen. 60 ml of the solution of tungsten compound prepared according to (a) are then added at room temperature.

The mixture is cooled to −15°C. 17.5 ml of a 1-molar of solution of diethyl aluminium chloride in toluene are then added with stirring. Polymerisation starts immediately, which can be recognised by a marked rise in the viscosity of the solution. The reaction temperature is controlled by external cooling so that it rises to 0°C in the course of 3 hours. Polymerisation is then terminated by the addition of a solution of 5 g of ethylene diamine and 5 of 2,2'-dihydroxy-3,3'-di-tert-butyl-5,5'-dimethyl-diphenylmethane and 20 g of ethanol in 200 ml of toluene. The polymer is isolated by introducing the polymer solution into hot water. On introduction of the polymer solution into hot water, a mixture of toluene and water distils off and the solvent-free polymer is precipitated as an aqueous suspension of lumps. The lumps are filtered off and dried under vacuum at 50°C. 1,240 g of anhydrous trans-1,4-polypentenamer are obtained.

| | |
|---|---|
| Mooney viscosity ML-4'/100°C (DIN 53 523) | 101 |
| Defo H/E (DIN 53 514) | 1225/26 |
| ($\eta$) toluene, 25°C, dl/9 | 2.49 |
| % trans-double bonds | 91.7 (determined by IR absorption)×) |

×) See G. Natta et al Angew. Chem. 76 765 (1964) Le A 13 398 c. Comparison experiment 100 ml of the solution of tungsten compound prepared under (a) are introduced into a dry vessel which is equipped with a gas inlet tube. Pure dry nitrogen is then passed through the solution for 2 hours. After passing through the solution, the nitrogen passes through two gas washing bottles which contain a total of 50 ml of 1 n sodium hydroxide solution. After termination of the experiment, the sodium hydroxyde solution is titrated against 1 n HCl using methyl orange as indicator. 32.3 mol of 1 n HCl are used up. Thus 17.7 mmol of hydrogen chloride (98.5 percent of the theory) removed from the tungsten solution on this experiment. As 100 ml of the solution contain 10 mmol of tungsten, the molar ratio or hydrogen chloride to tungsten in the original tungsten compound solution prepared according to (a) has been 1.77:1.

Polymerisation experiment (1b) is then repeated exactly as described with the tungsten compound solution from which hydrogen chloride has been removed.

1205 g of anhydrous polymer are obtained.

| | |
|---|---|
| Mooney viscosity ML-4'/100°C | 105 |
| Defo H/E, 80°C | 775/12 |
| ($\eta$), toluene, 25°C, dl/9 | 2.56 |
| % trans-double bonds | 91.4 |

The polymers obtained according to b and c have practically the same average molecular weight as shown by their nearly identical Mooney-viscosity and intrinsic viscosity ($\eta$) but differ drastically in their defo values. The defo hardness (H) and elasticity (E) of the polymer prepared in b (according to the invention) is twice as high as that obtained in c (comparison).

From the polymers obtained according to b and c rubber mixes were made in accordance with the following formulation on a rubber mill and then the mixes were vulcanised.

| Mixing formulation | |
|---|---|
| Components of mixture | Parts by weight |
| trans-1,5-polypentenamer | 100 |
| ISAF carbon black | 75 |
| highly aromatic extender oil (Naphtholen MV) | 45 |
| ZnO (RS) | 3 |
| stearic acid | 3 |
| N-phenyl-N-isopropyl paraphenylene diamine | 1 |
| Phenyl-$\alpha$-naphthylamine | 1 |
| Benzothiazolyl-2-cyclohexyl sulphonamide | 0.8 |
| sulphur | 2.0 |

The processibility on the rubber mill was classified on a scale of 1 to 6 in which 1 = very good and 6 = non-processible.

The polymer prepared according to b was classified at grade 2, but the polymer according to c was classified at 4.

The mixtures were vulcanised at 150°C. Table 1 below shows the properties of the vulcanisate.

Table 1

| | | | | | | | |
|---|---|---|---|---|---|---|---|
| | | | | | ShoreA | | Tear strength |
| | Vulcanisation | Tensile Strength | Elongation | Modulus | hardness | resilience | (Pohle) |
| Product | minutes at 150°C | kg wt/cm² | at break % | 300%, kg wt/cm² | 23°/75° | 23°/75° | kg wt/4 mm |
| | 10 | 113 | 580 | 72 | 62 58 | 45 47 | 22 |
| | 20 | 184 | 430 | 105 | 65 62 | 47 55 | 18 |
| Example 1b) | 30 | 186 | 455 | 109 | 66 63 | 47 55 | 17 |
| | 45 | 174 | 470 | 103 | 65 62 | 47 54 | 17 |
| | 60 | 173 | 475 | 102 | 65 62 | 47 54 | 17 |
| | 10 | 110 | 735 | 69 | 57 52 | 44 37 | 20 |
| | 20 | 153 | 555 | 87 | 63 60 | 47 51 | 18 |
| Example 1c) | 30 | 155 | 530 | 90 | 63 60 | 45 51 | 17 |
| | 45 | 155 | 540 | 86 | 63 59 | 46 51 | 17 |
| | 60 | 149 | 530 | 85 | 63 59 | 45 50 | 16 |

EXAMPLE 2 a. Preparation of tungsten component 135 ml of anhydrous toluene and 22.21 g of tungsten hexachloride are introduced into a stirrer vessel with exclusion of oxygen and water. 9.67 g of formaldehyde-bis-($\beta$-chloroethyl)-acetal $CH_2(OCH_2CH_2Cl)_2$ dissolved in 80 ml of toluene are added dropwise with stirring in the course of 15 minutes at room temperature. Stirring is then continued for another 90 minutes. The resulting dark brown solution contains 0.0755 mols tungsten per liter.

b. Polymerisation of cyclopentene 1,030 g of toluene and 200 g of cyclopentene are introduced into a stirrer vessel with exclusion of oxygen and water. 10.1 ml (= 0.76 m mol of tungsten compound) of the solution prepared under (2a) are added to the mixture under pure nitrogen. The mixture is cooled to −15°C with stirring and 2.2 ml of a 1-molar solution of diethyl aluminium chloride in toluene are then added. Polymerisation starts immediately. The reaction temperature is controlled by suitable external cooling so that it slowly rises to 0°C in the course of 3 hours. Polymerisation is then stopped by the addition of a mixture of 1 g of 2,2'-dihydroxy-3,3'-di-tert-butyl-5,5'-dimethyl-diphenylmethane, 1 g of ethylene diamine, 5 g of ethanol and 50 g of toluene. The polymer is precipitated by introducing the polymer solution into 3 litres of ethanol, and dried under vacuum at 50°C.

The conversion is 75 percent, i.e., 150 g of trans-1,5-polypentenamer.

| ($\eta$), toluene, 25°C. | 2.62 |
| ML-4'/100°C | 122 |
| Defo H/E, 80°C | 1250/21 | c. Comparison experiment 100 ml of the solution of tungsten compound prepared according to Example 2a are introduced into a dry vessel equipped with stirrer and freed from the hydrogen chloride dissolved in it by passing pure dry nitrogen through it as in Example 1c. The hydrogen chloride is absorbed in 50 ml of 1 n NaOH. The remaining 1 n-NaOH is determined by titration with 1 n HCl and found to be 34.0 ml so that 16 mmol of HCl evolved from the solution of tungsten salt, which is 100 percent of the theoretical amount.

Polymerisation experiment (2b) is repeated with this tungsten compound solution which is now free from hydrogen chloride. The yield is in this case 144 g = 72 percent conversion.

| ($\eta$), toluene, 25°C. | 2.61 |
| ML-4'/100°C | 111 |
| Defo H/E, 80°C | 800/13 |

The comparison of the data from 2b and 2c show that the polymer prepared in the presence of hydrogen chloride has improved Defo data attributable to a much wider distribution of molecular weight.

The processibility of the polymer prepared according to Example 2b is therefore good, whilst the product prepared according to 2c cannot be processed satisfactorily.

EXAMPLE 3

Polymerisation experiments were carried out as described in Example 2 in the presence of various quantities of hydrogen chloride. The experimental conditions and results are summarised in Table 2 below.

Table 2

| Experiment No. | Toluene g. | Cyclopentene g. | Polymerisation temperature °C | Tungsten compound according to Example 2c) mMol (phm) | HCl mMol (phm) | Al($C_2H_5$)$_2$Cl mMol (phm) | Polymerisation time |
|---|---|---|---|---|---|---|---|
| A | 1130 | 200 | −15 to 0 | 0.38 | 0 | 1.1 | 3 |
| B | 1130 | 200 | −15 to 0 | 0.38 | 0 | 1.1 | 3 |
| C | 1130 | 200 | −15 to 0 | 0.38 | 0.76 | 1.1 | 3 |
| D | 1130 | 200 | −15 to 0 | 0.38 | 0.76 | 1.1 | 3 |
| E | 1130 | 200 | −15 to 0 | 0.38 | 0.91 | 1.1 | 3 |
| F | 1130 | 200 | −15 to 0 | 0.38 | 0.91 | 1.1 | 3 |
| G | 1130 | 200 | −15 to 0 | 0.38 | 1.14 | 1.1 | 3 |
| H | 1130 | 200 | −15 to 0 | 0.38 | 1.14 | 1.1 | 3 |

| Experiment No. | Conversion % | Mooney[1] Viscosity ML-4'/100°C | Defo[2] hardness/ Elasticity at 80°C | ($\eta$) toluene 25°C dl/g | Cold flow[3] at 50°C mg/min | % trans-double[4] bond |
|---|---|---|---|---|---|---|
| A | 74 | 121 | 850/14 | 2.73 | 5.6 | 90.3 |
| B | 72 | 111 | 800/13 | 2.65 | 6.7 | 91.0 |
| C | 75 | 108 | 1300/27 | 2.47 | 0.1 | 91.8 |
| D | 75 | 102 | 1225/28 | 2.40 | 0.5 | 90.9 |
| E | 74 | 110 | 1275/29 | 2.44 | 0 | 91.4 |
| F | 75 | 107 | 1300/29 | 2.39 | — | 91.7 |
| G | 75 | 110 | 1275/31 | 2.55 | 0 | 91.4 |
| H | 75 | 102 | 1250/29 | 2.41 | 0 | 91.4 |

[1] DIN 53 523
[2] DIN 53 514
[3] Cold flow, determined in a modified outflow plastometer.
[4] Determined IR spectroscopically; see G Natta et al Angew Chem 76, 765 (1964).

The values for crude rubber in these experiments again show that the polymerisation process according to the invention (experiments C to H) results in polymers with wider molecular weight distribution. The cold flow of the products of the experiment was also determined. The polymers according to the invention have a distinctly lower cold flow (experiments C to H)

than comparison experiments A and B. Low cold flow is advantageous for storing and stacking of the polymers.

We claim:

1. A process for producing a predominantly transpolyalkenamer which comprises polymerizing a cyclomonoolefin having four, five or seven to 18 carbon atoms and dissolved in a hydrocarbon solvent in the presence of hydrogen chloride and a catalytic amount of a catalyst comprising
   a. a tungsten halide or oxyhalide,
   b. a cocatalyst which is selected from the group consisting of di-2-chloro-ethyl formal, diethyl formal and an epoxide of the formula

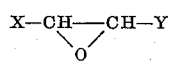

wherein X is hydrogen, alkyl having one to six carbon atoms, phenyl, tolyl, naphthyl, benzyl or one of said carbon atom containing substituents substituted by methyl or chlorine and Y is hydrogen, alkyl having one to six carbon atoms, phenyl, tolyl, napthyl, benzyl, or one of said carbon atom containing substituents substituted by methyl or chlorine or $CH_2$—Hal wherein Hal is halogen and
   c. an organoaluminum compound of the formula

wherein $R_1$ is alkyl having one to six carbon atoms and $R_2$ and $R_3$ are halogen or alkyl or alkoxy having one to six carbon atoms, the molar ratio of $(a):(b):(c)$ being 1:0.3 to 10:0.5 to 15 and the molar ratio of hydrogen chloride to tungsten being 0.1:1 to 10:1.

2. The process of claim 1 wherein the cyclomonoolefin is cyclopentene.

3. The process of claim 1 wherein the molar ratio of hydrogen chloride to tungsten is 1:1 to 4:1.

* * * * *